United States Patent [19]
Golitz et al.

[11] Patent Number: 5,583,079
[45] Date of Patent: Dec. 10, 1996

[54] CERAMIC PRODUCTS, OF GLASS, FLY ASH AND CLAY AND METHODS OF MAKING THE SAME

[76] Inventors: John T. Golitz, 291 Otis Rd., Barrington Hills, Ill. 60010; John F. Mainieri, 2465 Mt. Herman Rd., Granville, Ohio 43023; Bruce H. Bennett, 1170 Scarlet Ct., Westerville, Ohio 43081; Richard D. Moore, 401 Pinetree La.; Angela M. Paxton, 5476 U.S. 27 North, both of Richmond, Ind. 47374

[21] Appl. No.: 367,851

[22] Filed: Jul. 19, 1994

[51] Int. Cl.$^6$ .............................. C03C 1/00; C03C 1/02; C04B 18/06
[52] U.S. Cl. .................. 501/32; 501/129; 501/130; 501/131; 501/155; 106/624; 106/705; 106/710; 106/DIG. 1; 106/DIG. 4
[58] Field of Search .................. 501/32, 129, 130, 501/131, 155; 106/DIG. 1, DIG. 4, 624, 705, 710

[56] References Cited

U.S. PATENT DOCUMENTS

| | | | |
|---|---|---|---|
| 1,944,007 | 1/1934 | Hobart | 501/84 |
| 2,140,850 | 12/1938 | Palmieri et al. | 106/316 |
| 2,385,573 | 9/1945 | Hommel | 428/454 |
| 2,391,468 | 12/1945 | Long | 501/16 |
| 2,508,735 | 5/1950 | Van Horn | 501/20 |
| 2,576,565 | 11/1951 | Brown | 501/155 |
| 3,035,937 | 5/1962 | Baldauf et al. | 501/137 |
| 3,230,283 | 1/1966 | Hughes | 501/141 |
| 3,402,060 | 9/1968 | Groskaufmanis | 428/141 |
| 3,573,940 | 4/1971 | Cockrell et al. | 501/133 |
| 3,679,441 | 7/1972 | Harvey | 501/82 |
| 4,120,735 | 10/1978 | Smith | 106/DIG. 1 |
| 4,134,775 | 1/1979 | Schwoegler | 501/140 |
| 4,340,645 | 7/1982 | O'Conor | 501/67 |
| 4,501,618 | 2/1985 | Gebhard et al. | 106/705 |
| 4,680,059 | 7/1987 | Cook et al. | 106/705 |
| 4,780,144 | 10/1988 | Loggers | 106/710 |
| 5,002,611 | 3/1991 | Rademaker | 106/705 |
| 5,028,569 | 7/1991 | Cihon | 501/32 |
| 5,084,102 | 1/1992 | Brouns et al. | 106/705 |
| 5,108,679 | 4/1992 | Rirsch et al. | 106/705 |
| 5,152,837 | 10/1992 | Rademaker | 106/705 |
| 5,175,134 | 12/1992 | Kaneko et al. | 501/155 |
| 5,238,881 | 8/1993 | Norris | 501/20 |
| 5,275,989 | 1/1994 | Salge et al. | 501/143 |
| 5,366,548 | 11/1994 | Riddle | 106/705 |
| 5,484,480 | 1/1996 | Styron | 106/705 |

FOREIGN PATENT DOCUMENTS

| | | | |
|---|---|---|---|
| 8304232 | 12/1983 | Netherlands | 264/DIG. 49 |
| 895959 | 1/1982 | U.S.S.R. | |
| 1058615 | 1/1964 | United Kingdom | 264/DIG. 49 |

*Primary Examiner*—Mark L. Bell
*Assistant Examiner*—Louis M. Troilo
*Attorney, Agent, or Firm*—Leydig, Voit & Mayer, Ltd.

[57] ABSTRACT

A ceramic kiln-fired product which comprises glass, fly ash, and a clay binder. Further provided is a method for preparing raw material suitable for forming a shaped, kiln-fired, ceramic product. The method comprises mixing glass, fly ash, and a clay binder with from about 10 wt. % to about 15 wt. % water, on a dry weight basis, to form an aqueous mixture, separating the aqueous mixture using a mesh of from about 10 to about 12 screen into first and second portions, the first portion comprising the aqueous mixture which does not pass through the mesh and the second portion comprising the aqueous mixture which passes through the mesh, and drying the second portion until the moisture content of the second portion is less than about 0.5 wt. % to form the raw material. The present invention also provides a tile glazing formulation which may be used with the ceramic product of the present invention, as well as a method of using the formulation. The glazing formulation comprises, on a dry weight basis, about 70 wt. % to about 75 wt. % frit, about 8 wt. % to about 11 wt. % clay, about 2 wt. % to about 6 wt. % feldspar, about 1 wt. % to about 2 wt. % flint, about 6 wt. % to about 8 wt. % zinc oxide, about 6 wt. % to about 8 wt. % alumina.

24 Claims, No Drawings

CERAMIC PRODUCTS, OF GLASS, FLY ASH AND CLAY AND METHODS OF MAKING THE SAME

TECHNICAL FIELD OF THE INVENTION

The present invention relates to ceramic materials and methods for their preparation. More specifically, the present invention pertains to ceramic tiles which are suitable for both indoor and outdoor uses, methods for their preparation, and glazing formulations for such tiles.

BACKGROUND OF THE INVENTION

Ceramic materials have long been used in a wide variety of applications, including as roofing material and, more commonly today, as floor and wall coverings in homes. Innumerable formulations have been devised to produce kiln-fired ceramic materials having the appropriate properties for the desired end use. Traditional examples of those ceramic formulations include those which contain either shale or clay as the primary component.

Recently, however, formulations have been developed, in conjunction with the recycling movement, in which glass, e.g., waste glass, is included as a component of the ceramic formulation. The inclusion of glass in such formulations, however, was not achieved by simply substituting glass for another component in an existing clay or shale formulation. On the contrary, it was found that the introduction of glass into a ceramic formulation, due to its particular physical characteristics, influenced the properties of the formulation, the manner in which the formulation may be processed, and the characteristics of the final ceramic product prepared from the formulation. Accordingly, the preparation of ceramic products using glass, where glass had not been previously included as a component, was determined to require careful evaluation to insure that the resulting glass-based formulation is capable of being made into a tile and, further, that the characteristics of the resulting tile are not adversely affected due to the incompatibility of glass with the other formulation components.

One commercially significant property of ceramic tile products prepared using glass is the appearance of the finished product. Specifically, glass-based ceramic tiles, when a colorant such as a stain is added to the formulation, provide a tile which exhibits the color of the stain in a very vibrant manner. Due to the commercial significance of this color vibrancy, it is therefore essential that any new glass-based formulation provide a tile that has the desirable physical properties and staining characteristics of known glass-based tiles.

The vibrancy and depth of color associated with glass-based tiles may be further attributable to the ability of the color of the tile itself to be refracted through the body of the tile. Glass-based tile is an ideal medium for accepting a variety of colored stains, these stains imparting the desired color to the entire tile body. In contrast, conventional clay- and shale-based tiles, when fired, provide a tile that has a generally flat red color throughout. This is due to the colorants which are inherently present in the components used to prepare those tiles. Due to that inherent coloration, a minimal effect on the coloration of such tile bodies will be observed when a stain or other colorant is added to the formulation. Coloration is therefore typically added to those clay- and shale-based tiles only to the outer surface of the tiles. This is accomplished by means of a glaze which is applied to the outside of the tile body.

One example of a glass-containing ceramic formulation and product is provided by U.S. Pat. No. 5,028,569. The ceramic article disclosed therein is prepared from a raw batch formulation comprising virgin soda-lime glass, preferably in an amount greater than 60 to about 85 wt. %, clay, preferably in an amount from about 15 to about 40 wt. %, and, optionally, flint in an amount ranging from about 0 to about 10 wt. %.

U.S. Pat. No. 4,120,735 provides another example of a glass-based ceramic composition. This patent discloses a brick or other fired construction material prepared from a raw batch which comprises: the nonferrous, inorganic portion of municipal refuse, i.e., principally glass, as well as metals, slag, charred and unburned paper, and ash; coal fly ash; and a binder such as sodium silicate. Other binders said to be suitable substitutes for the sodium silicate are liquid extract, lignin sulfonate, lignin ammonium sulfonate, paraffin, starch, cellulosegum, methyl cellulose, and polyvinyl alcohol. No clay is included in the raw batch. In fact, conventional clay bricks were distinguished from the products disclosed in the patent in view of the clay brick's relatively low compressive strength and relatively high firing temperatures.

One disadvantage of tile formulations which include glass and clay, however, is the relatively high cost of these components. In particular, and depending upon the quality desired in the final ceramic product, the purity of the glass will impact the physical properties of the final product. One of the purest recycled glasses available is recycled soda lime silicate glass which, unfortunately, is quite expensive.

One glass-based ceramic product presently available which uses recycled soda lime silicate glass is Traffic Tile, manufactured by Stoneware Tile Company of Arlington Heights, Ill. This product comprises recycled soda lime silicate glass, clay, sand, and feldspar.

Moreover, glazing such glass-based ceramic tiles has also been problematic. Among other problems, those in the art have experienced difficulties in making the glazing formulation adhere to the glass-based green tile substrate. Adding to these problems is that there are no glazing formulations which are universal to every type of tile. Each type of tile formulation must be mated with a particular glazing formulation.

Thus, a need exists for a ceramic tile, and related method for its preparation, which exhibits the commercially-desirable characteristics of glass-based ceramic tiles, but at a lower cost. Moreover, it is particularly desirable that a new ceramic tile be able to meet established industry standards for conventional ceramic tiles, e.g., ANSI A 137.1. A need further exists for a glazing formulation that will adhere to such tiles and provide a uniformly glazed tile product after firing.

In view of those needs, one object of the present invention to provide a ceramic tile, and related method for its preparation, which exhibits the commercially-desirable characteristics of glass-based ceramic tiles, but at a lower cost.

A further object of the present invention is to provide a ceramic tile that is able to meet established industry standards, e.g., ANSI A 137.1.

Yet another object of the present invention is to provide a glazing formulation that will adhere to the new ceramic tiles and provide a uniformly glazed tile product after firing.

These and other objects and advantages of the present invention, as well as additional inventive features, will be apparent from the description of the invention provided herein.

BRIEF SUMMARY OF THE INVENTION

In one aspect, the present invention provides a ceramic kiln-fired product which comprises glass, fly ash, and a clay binder. The incorporation of fly ash with glass and a clay binder allows the preparation of a new glass-based ceramic tile which retains the commercially-desirable characteristics of other glass-based ceramic tiles, but at a lower cost. The tile of the present invention is also able to meet established industry standards for ceramic tile, e.g., ANSI A 137.1.

In another aspect, the present invention further provides a method for preparing raw material suitable for forming a shaped, kiln-fired, ceramic product. The method comprises mixing glass, fly ash, and a clay binder with from about 10 wt. % to about 15 wt. % water, on a dry weight basis, to form an aqueous mixture. The aqueous mixture is then separated, using a mesh of from about 10 to about 12 screen, into first and second portions. The first portion, which is defined as the aqueous mixture that does not pass through the mesh, may be set aside or recycled after further processing. The second portion of the aqueous mixture, which includes the aqueous mixture that passes through the mesh, is dried until its moisture content is less than about 8 wt. % to form the raw material.

In a further aspect, the present invention provides a tile glazing formulation which may be used with the glass-based ceramic product of the present invention. The glazing formulation comprises, on a dry weight basis, about 70 wt. % to about 75 wt. % frit, about 9 wt. % to about 11 wt. % clay, about 4 wt. % to about 6 wt. % feldspar, about 1 wt. % to about 2 wt. % flint, about 6 wt. % to about 8 wt. % zinc oxide, about 6 wt. % to about 8 wt. % alumina.

Yet another aspect of the present invention is a method for preparing a glazed glass-based ceramic tile product. This method comprises applying a glaze formulation onto a green ceramic tile body which comprises glass, fly ash, and a clay binder to form a glaze-coated green ceramic tile body. The glaze formulation comprises water and, on a dry weight basis, about 70 wt. % to about 75 wt. % frit, about 9 wt. % to about 11 wt. % clay, about 4 wt. % to about 6 wt. % feldspar, about 1 wt. % to about 2 wt. % flint, about 6 wt. % to about 8 wt. % zinc oxide, and about 6 wt. % to about 8 wt. % alumina. After the glaze is applied, the glaze-coated green ceramic tile body is heated in a kiln, the kiln reaching a maximum temperature of from about 970° C. to about 1025° C., for a period of about 40 to about 60 minutes to form the glazed ceramic tile product.

The invention may best be understood with reference to the following detailed description of the preferred embodiments.

DESCRIPTION OF THE PREFERRED EMBODIMENTS

The present invention provides a ceramic kiln-fired product which comprises glass, fly ash, and a clay binder. The invention is predicated at least in part upon the discovery that fly ash can be incorporated successfully into a ceramic formulation containing glass and a clay binder, and that a commercially-acceptable ceramic product can be formed from that formulation. That fly ash could be used in the manner of the present invention was surprising in view of certain characteristics of the ash which would appear to render it an undesirable component in a ceramic formulation, e.g., spherical shape, fine particle size, and high iron content.

It has also been surprisingly discovered that fired ceramic tiles having the composition of the present; invention exhibited physical characteristics that were comparable to certain known ceramic tile products, even those which are not glass-based. Moreover, the present invention provides tiles at a relatively lower cost as compared to known glass-based ceramic tiles.

In addition, and unexpectedly, the inclusion of the grayish-black-colored fly ash with the glass and clay binder did not result in the color of the final ceramic product being unduly muddied by the fly ash. The vibrancy and depth of color traditionally sought after in, and associated with, stained glass-based tiles was therefore able to be maintained. This is all the more surprising when one considers that a component, fly ash, has been included in a formulation which would, by all estimations, cause a significant loss in vibrancy, and/or otherwise darken, any color imparted to the tile by a stain or other colorant.

A further benefit of the present invention is that it can use recycled glass. An additional benefit is its use of fly ash. Fly ash is a voluminous by-product of coalburning power plants. Unfortunately, the supply of fly ash far outstrips the amount presently able to be consumed. The present invention addresses this situation by converting that by-product, and recycled glass, into useful, high quality, products.

In preparing the ceramic product of the present invention, it was found that advantageous results were obtained when the ceramic product comprised a clay binder, glass in an amount of at least about 25%, and fly ash in an amount of at least about 30%, as measured on a dry weight basis. It was further determined that, more advantageously, the glass may be present in an amount ranging from about 25% to about 50%, advantageously from about 35% to about 45%, and the fly ash in an amount ranging from about 20% to about 65%, advantageously from about 25% to about 45%. In addition, and preferably, the amount of clay binder, on a dry weight basis, may range from at least about 10% of the ceramic basis, advantageously from about 10% to about 40%, and preferably from about 20% to about 30%. These values were selected because the inclusion of clay at the recited level was found to impart an optimal degree of plasticity in the composition. Absent this degree of plasticity, the composition is very rigid. This rigidity makes it very difficult to successfully prepare a tile from the composition that will retain its shape after pressing, as well as during subsequent processing, e.g., glazing and/or firing. The glass was found to function in the composition of the present invention at least as a type of binder of both the fly ash and the clay. Specifically, the glass acts to fuse the clay and fly ash. Significantly, with the inclusion of glass, the fusing of the fly ash and clay components was able to be completed at temperatures lower than those that would be required to fuse the fly ash and clay in the absence of glass.

Additional enhancements in the ceramic product were obtained when the clay binder comprised bentonite, kaolin clay, and ball clay. The ball clay improves the plasticity of the composition during pressing of the composition into a desired shape, and increases the strength of the green body formed from the composition. The kaolin clay functions to improve the strength of the ceramic product. The bentonite improves the plasticity of the composition during pressing, and also reduces the liquid absorption of the fired ceramic product. Most preferably, the clay binder may comprise, based on the dry weight of the ceramic product, about 1% to about 2% bentonite, about 3% to about 15% kaolin clay, and about 1% to about 3% ball clay.

Wollastonite, advantageously in an amount of about 5% to about 8%, based on the dry weight basis of the ceramic product, may also be included in the composition. This component improves the strength of the green body, and also reduces the degree of shrinkage experienced by the green body during firing.

The fly ash component of the present invention consists principally of minute, separable glass spheres, some crystalline matter, and varying amounts of unburned carbon. It was determined that higher percentages of carbon in the fly ash resulted in longer firing times and a lower density final product. Accordingly, the fly ash advantageously may contain less than about 0.5wt. % carbon, and preferably less than about 0.25 wt. % carbon.

The fly ash useful in the present invention may be advantageously selected from either of the two types of commonly available ash, either Class F or Class C fly ash. Class F fly ash has a lower level of calcium oxide and a higher percentage of silica than Class C fly ash. Although either type of fly ash is contemplated as being useful in the present invention, it is desirable from an environmental perspective to utilize the relatively less commercially useful type of fly ash, i.e., Class F fly ash.

Class F fly ash, on average, has the composition set forth in Table A, as determined by test methods set forth in ASTM C-311. The typical wt. % ranges for each component of this ash are also set forth in the table.

TABLE A

| Component | Formula | Average wt. % | Range wt. % |
| --- | --- | --- | --- |
| Silica | SiO$_2$ | 58.1 | 50–60 |
| Aluminum oxide | Al$_2$O$_3$ | 29.6 | 25–30 |
| Iron oxide | Fe$_2$O$_3$ | 4.6 | 2–10 |
| Titanium dioxide | TiO$_2$ | 1.8 | 1–2 |
| Potassium oxide | K$_2$O | 2.6 | 1–3 |
| Others (includes 0.25 wt. % to 0.5 wt. % carbon) | — | 3.3 | 0–5 |

Class C fly ash, on average, has the composition set forth in Table B, as determined by test methods set forth in ASTM C-311. The typical wt. % ranges for each component of that ash are also set forth in that table.

TABLE B

| Component | Formula | Average wt. % | Range wt. % |
| --- | --- | --- | --- |
| Silica | SiO$_2$ | 39.8 | 35–45 |
| Aluminum oxide | Al$_2$O$_3$ | 18.6 | 15–20 |
| Iron oxide | Fe$_2$O$_3$ | 6.0 | 2–8 |
| Titanium dioxide | TiO$_2$ | 1.7 | 1–2 |
| Potassium oxide | K$_2$O | 0.4 | 1–2 |
| Calcium Oxide | CaO | 23.0 | 20–30 |
| Others (includes less than 0.5 wt. % carbon) | — | 10.5 | 0–5 |

In accordance with another aspect of the present invention, there is provided a method for preparing raw material suitable for forming a shaped ceramic product. The method comprises mixing glass, fly ash, and a clay binder with from about 10 wt. % to about 15 wt. % water, on a dry weight basis, to form an aqueous mixture. The aqueous mixture is then separated using a mesh of 10 to 12 screen into first and second portions. The first portion comprises the aqueous mixture which does not pass through the mesh, and the second portion comprises the aqueous mixture which passes through the mesh.

The particular screen value recited herein is used in order to reduce the occurrence of laminations (horizonal cracks) in the final ceramic product. In particular, these laminations were found to occur when air remains entrapped between the particles of the mixture after pressing. It was determined that the occurrence of laminations could be prevented, or at least significantly reduced, when the particles in the mixture were screened to between a 10 and 12 screen mesh prior to pressing. Particles of this size were found to allow any air trapped in the mixture to escape during the pressing operation, providing a substantially air-free pressed body.

The second portion is then dried until its moisture content is less than about 8 wt. % to form the raw material. A uniform moisture content is important for continuous processing as thickness and shrinkage of the pre-fired body is dependent upon the moisture content at this stage of processing. Therefore, the moisture level should be constant throughout the mixture. Moreover, if the mixture retains too much moisture, drying times must be increased, increasing processing costs.

Advantageously, the aqueous mixture may be formed in two stages. In the first stage, the glass, fly ash, and a clay binder are thoroughly mixed with from about 2 wt. % to about 4 wt. % water, on a dry weight basis, to form a first precursor of the aqueous mixture. The first precursor is then passed through a pug mill while from about 10 wt. % to about 15 wt. % water, on a dry weight basis, is added to the first precursor. At the completion of this process step, a second precursor of the aqueous mixture is provided. The second precursor is then passed through the same or different a pug mill, providing the desired aqueous mixture.

If desired, the first portion of the aqueous mixture, i.e., the aqueous mixture that did not pass through the screen, may be recycled by passing the first portion through a pulverizer to reduce the average size of the components therein. The pulverized material may then be reintroduced into the first or second precursor mixture prior to the separation of the aqueous mixture.

Advantageously, the second portion may be dried to the level of less than about 8 wt. % by passing the second portion through a heated fluid bed dryer. This drying serves to remove excess moisture, but allows the mixture to retain enough moisture so that it does not separate prior to pressing. The dryer may preferably operate at a temperature ranging from about 65° C. to about 100° C.

In certain applications, it is desirable to apply a glaze onto a tile. In accordance with another aspect of the present invention, there is provided a glazing formulation that "fits" (e.g., the glaze adheres to the tile properly under firing and drying conditions, and neither crazes or crawls) the ceramic tile of the present invention. In particular, the glazing formulation of the present invention comprises, on a dry weight basis, about 70 wt. % to about 75 wt. % frit, about 8 wt. % to about 11 wt. % clay, about 2 wt. % to about 6 wt. % feldspar, about 1 wt. % to about 2 wt. % flint, about 6 wt. % to about 8 wt. % zinc oxide, about 6 wt. % to about 8 wt. % alumina. The components, and associated weight ranges, were selected to ensure proper glaze "fit" to the ceramic product.

Advantageously, the glazing formulation comprises, on a dry weight basis, about 70 wt. % to about 75 wt. % frit, about 7 wt. % to about 9 wt. % kaolin clay, about 2 wt. % to about 4 wt. % feldspar, about 1 wt. % to about 2 wt. % flint, about 7 wt. % to about 8 wt. % zinc oxide, about 7 wt. % to about 8 wt. % alumina, about 2 wt. % to about 3 wt. % bentonite, and about 0 wt. % to about 5 wt. % of a colorant, Most preferably, the glazing formulation comprises, on a dry weight basis, about 68 wt. % frit, about 8 wt. % kaolin clay, about 3 wt. % feldspar, about 1 wt. % flint, about 7 wt. % zinc oxide, about 7 wt. % alumina, about 1 wt. % bentonite, and about 0 wt. % to about 5 wt. % of a colorant.

Prior to applying the glazing compound onto a tile, the formulation should be liquified such that the formulation possesses a specific gravity of about 1.7. This allows the glazing compound to be sprayed onto the surface of the ceramic item evenly. If the specific gravity is too low, the glazing compound will "run" during firing. Water is advantageously used as the liquefier.

Yet another aspect of the present invention provides a method for the preparation of a glazed ceramic tile product. This method comprises applying the glaze formulation described previously onto a green ceramic tile body which comprises glass, fly ash, and a clay binder to form a glaze-coated green ceramic tile body. That glaze-coated body is then heated in a kiln which reaches a maximum temperature of from about 970° C. to about 1025° C. for a period of about 40 to about 60 minutes, and advantageously from about 45 to about 60 minutes, to form the glazed ceramic tile product. The glazing compound may be applied onto the tile using any known apparatus suitable for providing a commercially-acceptable glazed tile. The construction and operation of such apparatus will be readily appreciated by those skilled in the art.

The kiln temperature is selected in view of the following factors: the glaze composition, the composition of the ceramic body, and the removal of all carbon and mechanical and chemical water from the ceramic body. The particular temperature ranges selected for purposes of the present invention were so selected to ensure that the glass is vitrified and all mechanical and chemical water is removed from the ceramic body. The temperature should further be selected to ensure sufficient oxidation of the body to remove at least organic matter (e.g., carbon) and recomposition of the body wherein at least the carbonate minerals have been removed. When the temperature is too low, the glass will vitrify, but the clay and fly ash are not completely densified.

Advantageously, and before the glaze formulation is applied onto the green ceramic tile body, the water content of the green ceramic tile body is reduced to less than about 0.5 wt. %. This is done in order to remove all mechanical water remaining in the tile body. If this water is not removed, the tile body will bloat and explode during firing. This reduction may be accomplished by heating the green ceramic tile body in a dryer at a temperature and for a period of time sufficient to adjust the water content in the green ceramic tile body to less than about 0.5 wt. %. The dryer may preferably have an entrance temperature ranging from about 95° C. to about 115° C., most preferably from about 102° C. to about 110° C., and an exit temperature ranging from about 110° C. to about 160° C., most preferably from about 135° C. to about 140° C. These temperatures were selected because the moisture is removed gradually, in order to prevent damage to the green tile body.

Preferably, after the glaze formulation is applied onto the green ceramic tile body, the water content in the glaze formulation is reduced so that it does not exceed about 0.4 wt. %. If the water content exceeds that level, the tile may fracture. This reduction may be accomplished by evaporating the water from the glaze formulation. The evaporation will occur when the wet glaze is applied onto the warm tile.

The following example further illustrates the present invention but, of course, should not be construed as in any way limiting its scope.

EXAMPLE

The following is an example of the process for preparing a glass-based ceramic tile in accordance with the present invention.

Materials in the amount shown in Table C were placed into a Patterson-Kelly blender and mixed until the materials were completely and thoroughly blended. Water was added to the mixture during the blending process so that the mixture has approximately 2% moisture. The resulting tile body material was used in the production run.

TABLE C

| Component | Weight |
|---|---|
| GS-200 Glass[1] | 32.0 |
| GL-70 Glass[2] | 10.0 |
| Wallastonite | 8.0 |
| Kaolin Clay | 15.0 |
| Bentonite | 2.0 |
| Old Hickory Clay[3] | 3.0 |
| Class F fly ash | 30.0 |
| Total | 100.0 |

[1]GS-200 glass is recycled soda-lime glass and is available from Allwaste (Houston, Texas).
[2]GL-70 glass is recycled soda-lime glass and is available from Allwaste (Houston, Texas).
[3]Old Hickory Clay is a ball clay and is available from Old Hickory Clay (Hickory, Kentucky).

The blended materials are then transferred to a storage hopper and stored for the next process, i.e., the Pug Mills. The blended materials were used within about 5 days in order to avoid problems in forming the raw material into the desired shape.

The material was then introduced into the Pug Mills, with water being added during that blending such that the aqueous mixture prepared thereby contained approximately 13 wt. % moisture. The aqueous mixture was then passed through a 12 mesh screen upon exiting the Pug Mills. That portion of the mixture, if any, that did not pass through the screen was crushed in a pulverizer and recycled into the mixture prior to the point at which it was separated by the screen.

The resulting material was then passed through a Jeffrey Dryer which was set at approximately 80° C. It should be appreciated that the temperature of the drier was monitored and adjusted to compensate for ambient conditions in the plant and variations in the moisture content of the material entering the dryer so that the product exiting the dryer contained approximately 7.5 wt. % moisture.

The resulting dried material was then introduced into hoppers and automatically fed therefrom to the presses. The presses compressed the dried material into the desired shape by passing the material through a die designed for the shape of the tile desired at a minimum of one ton psi.

After pressing, shaped material was conveyed to the main dryer, a Singer Dryer, which has a 1,100 foot continuous chain drive. The temperature of the drier was set such that it had an entrance temperature of 107° C. and exit temperature of 116° C. with the residence time set at approximately 70 minutes. The tiles exited the dryer with moisture levels below one half of one per cent.

The green tile exiting the dryer was conveyed to a glazing station where the glaze was applied. The glaze had been previously prepared in a glaze mixer and possessed a specific gravity of 1.68. Its composition was as set forth in Table D:

TABLE D

| Component | Lbs. in Batch | |
|---|---|---|
| 1.5 NiO$_4$ | 9.00 | 1% |
| 7.8 Huber D-6[1] | 48.00 | 5.5 |
| Flint | 9.00 | 1 |
| GS 530 stain[2] | 1.00 | 0.5 |

TABLE D-continued

| Component | Lbs. in Batch | |
|---|---|---|
| GS 340 stain[3] | 2.50 | 0.5 |
| LG 4245 stain[4] | 0.75 | 0.5 |
| Ultrox[5] | 6.00 | 0.6 |
| F-49[6] | 350.00 | 40 |
| Zinc oxide | 42.00 | 5% |
| Alumina | 42.00 | 5% |
| FZ-16[7] | 70.00 | 8% |
| K-2292[8] | 4.80 | 0.5 |
| Felspar | 18.00 | 2% |
| Bentonite | 6.00 | 0.5 |
| Water | 270.90 | |
| Total | 879.95 | |

[1]Huber D-6 is a kaolin clay and is available from Evans Clay Company (McIntyre, Georgia).
[2]GS 530 is a stain and is available from Miles Corp. (Baltimore, Maryland).
[3]GS 340 is a stain and is available from Miles Corp. (Baltimore, Maryland).
[4]LG 4245 is a stain and is available from Miles Corp. (Baltimore, Maryland).
[5]Ultrox is an opacifier and is available from Fusion (Carrollton, Ohio).
[6]F-49 is a frit and is available from Fusion. (Carrollton, Ohio).
[7]FZ-16 is a frit and is available from Fusion. (Carrollton, Ohio).
[8]K-2292 is a stain and is available from Fusion. (Carrollton, Ohio).

The glaze was automatically sprayed uniformly over the entire surface of the warm green tile at a rate of 0.4 g/in$^2$. The glaze-laden green tile was then conveyed into the kiln accumulator. During its residence in the accumulator, the water in the glaze evaporated.

The tile was passed from the accumulator to a continuously-fired Swindell Dressler Kiln on a chain belt system. The tile moisture did not exceed 0.4% at the entrance to the kiln. The green, glaze-laden tile was fired for approximately 50 minutes, with kiln reaching a peak temperature of 1010° C. Upon exiting the kiln, the fired, glazed tile was cooled to approximately 177° C. in an after-cooler device and subsequently air cooled to provide the final glazed tile product.

All of the references cited herein are hereby incorporated in their entireties by reference. Unless otherwise indicated, all component percentages are in weight percent based upon the dry weight of the relevant composition.

While this invention has been described with an emphasis upon a preferred embodiment, it will be obvious to those of ordinary skill in the art that variations of the preferred products and methods may be used and that it is intended that the invention may be practiced otherwise than as specifically described herein. Accordingly, this invention includes all modifications encompassed within the spirit and scope of the invention as defined by the following claims.

What is claimed is:

1. A ceramic product comprising glass, fly ash, and a clay binder wherein the glass is about 25–50 weight percent, the fly ash is about 20–65 weight percent and the clay binder is at least 10 weighty percent of the ceramic product on a dry weight basis.

2. The ceramic product according to claim 1, wherein the clay binder is, on a dry weight basis of the ceramic product, about 1% to about 2% bentonite, about 3% to about 15% kaolin clay, and about 1% to about 3% ball clay.

3. The ceramic product according to claim 2, further comprising about 5% to about 8% wollastonite.

4. The ceramic product according to claim 1, wherein the fly ash is Class F fly ash.

5. The ceramic product according to claim 1, wherein the fly ash is Class C fly ash.

6. The ceramic product according to claim 1, wherein the glass is about 40%, the fly ash is about 30%, and the clay binder is at least about 10% of the ceramic product on a dry weight basis of the ceramic product.

7. The ceramic product according to claim 4, wherein the clay binder is selected from the group consisting of bentonite, kaolin clay, ball clay, and mixtures thereof.

8. The ceramic product according to claim 1, wherein the product meets the standards set forth in ANSI A 137.1.

9. The ceramic product according to claim 1, wherein the carbon content of the fly ash is less than about 0.5 wt. % based on the total weight of the fly ash.

10. A ceramic product consisting essentially of glass, fly ash, and a clay binder wherein the glass is about 25–50 weight percent, the fly ash is about 20–65 weight percent and the clay binder is at least 10 weight percent of the ceramic product on a dry weight on a dry weight basis.

11. The ceramic product according to claim 10, wherein the clay binder is selected from the group consisting of bentonite, kaolin clay, ball clay, and mixtures thereof.

12. The ceramic product according to claim 10, wherein the fly ash is Class F fly ash.

13. The ceramic product according to claim 10, wherein the fly ash is Class C fly ash.

14. The ceramic product according to claim 10, wherein the carbon content of the fly ash is less than about 0.5 wt. % based on the total weight of the fly ash.

15. A method for preparing raw material suitable for forming a shaped ceramic product comprising mixing 25–50 wt. % glass, 20–65 wt. % fly ash and at least 10 wt. % clay binder with from about 10 wt. % to about 15 wt. % water, on a dry weight basis, to form an aqueous mixture, separating the aqueous mixture using a mesh of from about 10 to about 12 screen into first and second portions, the first portion comprising the aqueous mixture which does not pass through the mesh and the second portion comprising the aqueous mixture which passes through the mesh, and drying the second portion until the moisture content of the second portion is less than about 8 wt. % to form the raw material.

16. The method according to claim 15, wherein the aqueous mixture is formed by mixing glass, fly ash, and a clay binder with from about 2 wt. % to about 4 wt. % water, on a dry weight basis, to form a first precursor of the aqueous mixture, passing the first precursor through a pug mill while adding from about 10 wt. % to about 15 wt. % water thereto, on a dry weight basis, to form a second precursor of the aqueous mixture, and passing the second precursor through a pug mill to provide the aqueous mixture.

17. The method according to claim 16, further comprising passing the first portion through a pulverizer and reintroducing the pulverized first portion into the first precursor or the second precursor prior to the separation of the aqueous mixture.

18. The method according to claim 16, wherein the second portion is dried by passing the second portion through a heated fluid bed dryer operating at a temperature of from about 65° C. to about 100° C.

19. The method according to claim 15, wherein the clay binder is selected from the group consisting of bentonite, kaolin clay, ball clay, and mixtures thereof.

20. The method according to claim 19, wherein the aqueous mixture further comprises wollastonite.

21. The method according to claim 19, wherein the fly ash is Class F fly ash.

22. The method according to claim 19, wherein the fly ash is Class C fly ash.

23. The method according to claim 19, wherein the carbon content of the fly ash is less than about 0.5 wt. % based on the total weight of the fly ash.

24. The method according to claim 23, wherein the clay binder is a mixture of bentonite, kaolin clay, and ball clay.

* * * * *